April 6, 1926.

P. YUNGLING 1,579,903

ROTARY DRAW WORKS CLUTCH AND BRAKE

Filed May 21, 1925   2 Sheets-Sheet 1

INVENTOR.
Paul Yungling
BY Nestall and Wallace
ATTORNEYS.

April 6, 1926.                                                                                   1,579,903
P. YUNGLING
ROTARY DRAW WORKS CLUTCH AND BRAKE
Filed May 21, 1925    2 Sheets-Sheet 2
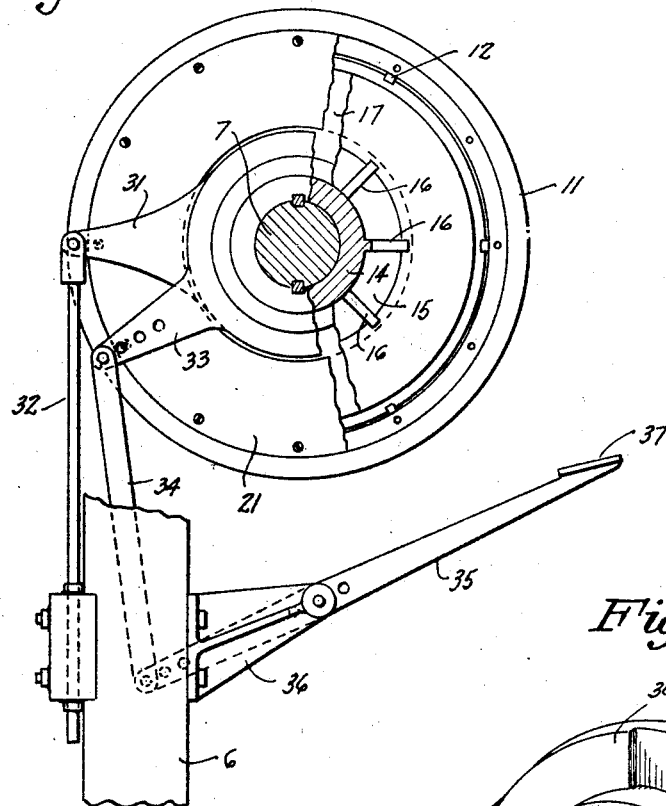
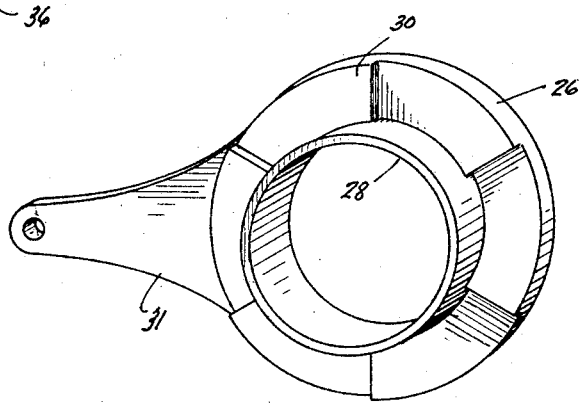
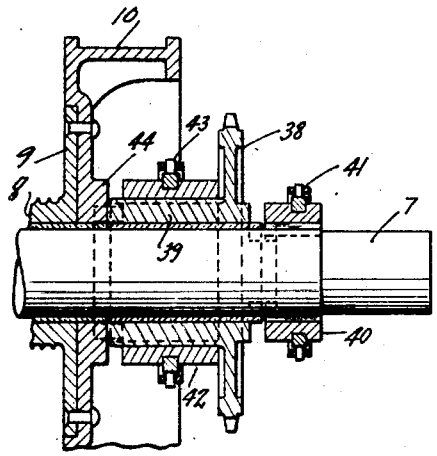
INVENTOR.
Paul Yungling
BY  Nestall and Wallace
ATTORNEYS.

Patented Apr. 6, 1926.

1,579,903

UNITED STATES PATENT OFFICE.

PAUL YUNGLING, OF LOS ANGELES, CALIFORNIA ASSIGNOR TO OIL FIELDS SPECIALTIES COMPANY, OF LOS ANGELES, CALIFORNIA, A CORPORATION OF CALIFORNIA.

ROTARY DRAW-WORKS CLUTCH AND BRAKE.

Application filed May 21, 1925. Serial No. 31,964.

*To all whom it may concern:*

Be it known that I, PAUL YUNGLING, a citizen of the United States, and resident of Los Angeles, in the county of Los Angeles, State of California, have invented new and useful Improvements in a Rotary Draw-Works Clutch and Brake, of which the following is a specification.

This invention relates to a clutch and brake of the disk type and is especially useful in the operation of winches. The embodiment herein is illustrated as applied to the draw works used in well drilling.

In the drilling of oil wells by the rotary hydraulic method, it is the common practice to suspend the boring tools by means of a cable wound upon a drum. The tools are elevated by winding the cable upon the drum and are lowered by unclutching the drum from the driving apparatus and permitting the weight of the suspended string to unwind the cable from the drum. The unwinding is controlled by a brake, and, commonly, a brake drum and external brake bands are employed. Such brakes are not very efficient and together with the drum become excessively hot, thereby increasing the liability of breakage of parts with consequent increase of liability of injury to the operators. Disk brakes are efficient, being sensitive, requiring low compression pressure and running comparatively cool. The present invention has for its primary object the provision of a disk coupling which may serve the purpose of either a brake or clutch and which is compact, durable, and strong.

Figure 1:
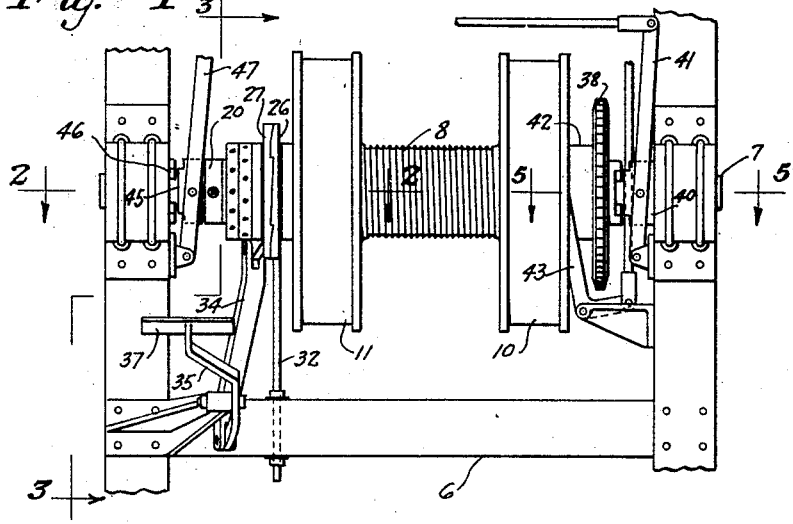
Figure 2:
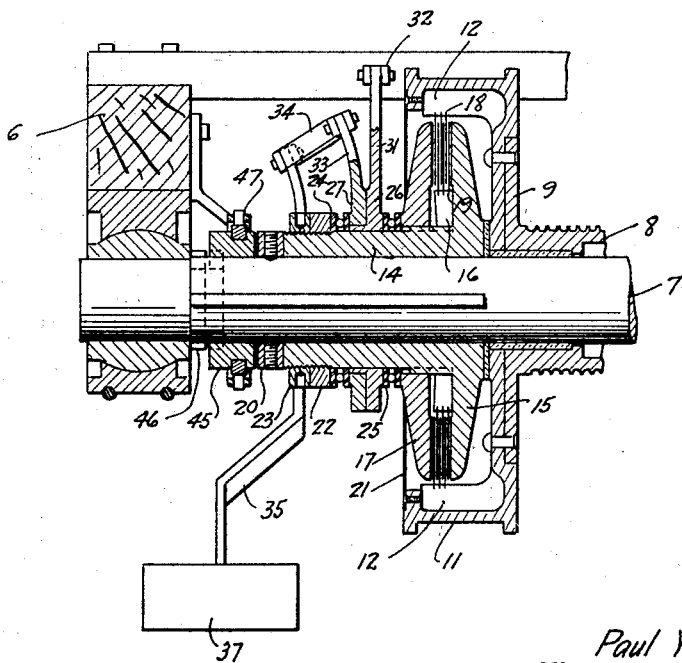

These objects together with other objects and corresponding accomplishments are obtained by means of the embodiment of my invention illustrated in the accompanying drawings, in which:

Fig. 1 is an elevation of a draw works equipped with my improved combination disk and clutch; Fig. 2 is a section taken on the line 2—2 of Fig. 1 showing a fragment of the structure on an enlarged scale; Fig. 3 is a section as seen on the line 3—3 of Fig. 1, a portion of the clutch housing plate being broken away to better show the structure; Fig. 4 is a perspective view of one member of the clutch pressure operating device; and Fig. 5 is an axial section showing a fragment of the structure as seen on the line 5—5 of Fig. 1.

Referring more particularly to the drawing, frame 6 carries the draw works and may be bolted to the derrick or other supporting structure. The frame is provided with side members to which are secured self aligning bearings. Journalled in the bearings is a shaft 7. Rotatably mounted upon the shaft is a drum 8 having a spiral groove upon its surface to receive the cable which may be wound thereon. The ends of the drum are provided with flanges 9 so as to form a spool. Secured to a flange 9 at one end by any suitable means is a flange and brake drum 10 and at the other end a similar member 11 forming a coupling head which has the usual external brake drum surface. On the under side of the drum 11 are spaced ribs 12.

Keyed to the shaft 7 is a sleeve 14. At the end of the sleeve and within the drum 11 is a head 15 forming a pressure member for the coupling disks. The coupling head is provided with radial ribs 16 for engaging disks. Mounted upon sleeve 14 so that it may be moved longitudinally thereon is a head 17 corresponding to head 15. Disposed between opposing faces of heads 15 and 17 are disks. A set of disks 18 are of such external diameter that indentations may be formed in the outer edges to receive the ribs 12 on the drum. Alternating with the disks 18 are disks 19 forming a set which are of less external diameter than ribs 12 so as to clear the latter and are of such internal diameter as to overlap the ribs 16. Indentations are formed so that the ribs 16 fit therein. Thus, there are disks secured to the drum 11 and disks 19 secured to the sleeve 14. A collar 20 holds the sleeve 14 against displacement endwise. A closure plate 21 is secured to the outer face of drum 11 forming a channel to receive and retain fluid for cooling purposes. Mounted upon the end of sleeve 14 is an annular collar 22 which is locked in position by a collar 23. Disposed between ball bearing thrust collars 24 and 25 on sleeve 14 are compressor rings 26 and 27. Ring 26 has a bearing collar 28 upon which ring 27 rides. The opposing faces of compressor rings 26 and 27 have teeth formed thereon as indicated by 30. These teeth are formed by inclined surfaces so that when the rings are relatively rotated, the teeth on one ring will ride upon the teeth of the other ring forcing the rings apart until the teeth override one another. Thus, by relatively rotating the disks they may be forced away from one another. Ring 26 has an arm 31 extending outwardly to which is attached a link rod 32 which is anchored to the frame, as best shown in Fig. 3. Ring 27 has an arm 33 secured by a connecting rod 34 to a pedal lever 35, the latter being pivotally mounted by means of a standard 36 upon the frame. The construction is such that upon pressing downwardly upon the pedal 37, ring 27 will be rotated so as to force the rings away from one another and press coupling head 17 toward coupling head 15, thereby compressing the disks 18 and 19 and either clutching the drum to the sleeve and thereby to the shaft or exerting a frictional drag between the sleeve and the drum. Thus, when the shaft 7 is being driven, pressure upon the pedal 37 will cause the winding drum to be clutched to the shaft and to be rotated therewith.

In order to drive the shaft 7, I have provided a sprocket wheel 38 having a long hub 39, the hub being journalled upon the shaft. Splined upon the shaft is a clutch collar 40 operable from a fork 41 to engage and disengage a corresponding clutch end on hub 39. Splined on the hub 39 is a clutch collar 42 operable by a fork 43 whereby to engage and disengage a cooperating clutch member 44 on the drum 10. Thus, the driving sprocket 38 may be connected to shaft 7 or directly to the hoisting drum. The latter connection is for the purposes of emergency in case the clutch and brake at the other end becomes inoperative.

At the other end of the shaft 7 is a clutch jaw 45 splined to the shaft and arranged to be engaged with a clutch jaw 46 fixed to the bearing. Levers 47 are provided for throwing clutch jaw 45 into engagement with clutch jaw 46. When clutch jaws 45 and 46 are in engagement, shaft 7 is held against rotation.

In the normal operation of the draw works, to wind the cable upon the drum, the operator engages clutch jaw 40 with clutch jaw on sprocket 38 so as to drive the shaft 7, being sure that clutch jaw 45 is out of engagement with clutch jaw 46. Shaft 7 is thus clutched to the source of power and rotated. To engage the drum of the shaft, pedal 37 is pressed so as to press the disk plates together and thereby couple sleeve 14 to drum 11. Suppose it is desired to unwind the cable from the drum, lever 41 is operated to disengage clutch jaw 40 from sprocket 38, thus freeing shaft 7 from the source of power and allowing the sprocket 38 to idle. Lever 47 is then operated to throw clutch jaw 45 into engagement with clutch jaw 46, thereby clutching the shaft to the frame so that it will not rotate. By applying the proper pressure to pedal 37, a frictional drag may be placed upon the drum so that the unwinding of the latter may be controlled.

It is obvious that the large area of the disk plate is such as to provide a large frictional surface so that the pressure required for braking and clutching is relatively small. It is obvious that an external brake band may also be used as desired.

What I claim is:

1. The combination of a shaft; means to drive said shaft or permit idling thereof; means to lock said shaft against rotation; a rotatable member journalled on said shaft; and disks for frictionally gripping said rotatable member to said shaft.

2. The combination of a shaft; means to drive said shaft or to permit the idling thereof; means to lock said shaft against rotation; a rotatable member journalled on said shaft; and a multiple disk coupling comprising a set of disks connected to said shaft, and means to engage said disks to provide a frictional coupling.

3. The combination of a shaft; means to drive said shaft or to permit idling thereof; means to lock said shaft against rotation; a rotatable member journalled on said shaft; and a multiple disk coupling comprising a set of disks connected to said rotatable member, a set of disks connected to said shaft, means to compress said disks to provide a frictional coupling.

4. A combination of a shaft; means to drive said shaft or permit idling thereof; means to lock said shaft against rotation; a drum journalled on said shaft and having a recess at one side; and a multiple disk coupling housed in said recess comprising pressure heads, a set of disks connected to said drum within said housing, a set of disks connected to said shaft, means to adjustably force said heads toward each other and to frictionally engage said disks.

5. The combination of a shaft, means to drive said shaft or to permit idling thereof, means to lock said shaft against rotation; a drum journalled on said shaft and having a recess at one side; and a multiple disk coupling in said recess comprising a sleeve fixed to said shaft so as to be rotated therewith and having a pressure head at one end, a pressure head longitudinally slidable on said sleeve, a set of disks secured to said drum, a set of disks secured to the pressure head on said sleeve, and means to adjustably force said heads toward each other so as to frictionally engage said disk.

In witness that I claim the foregoing I have hereunto subscribed my name this 12th day of May, 1925.

PAUL YUNGLING.